Patented Dec. 12, 1944

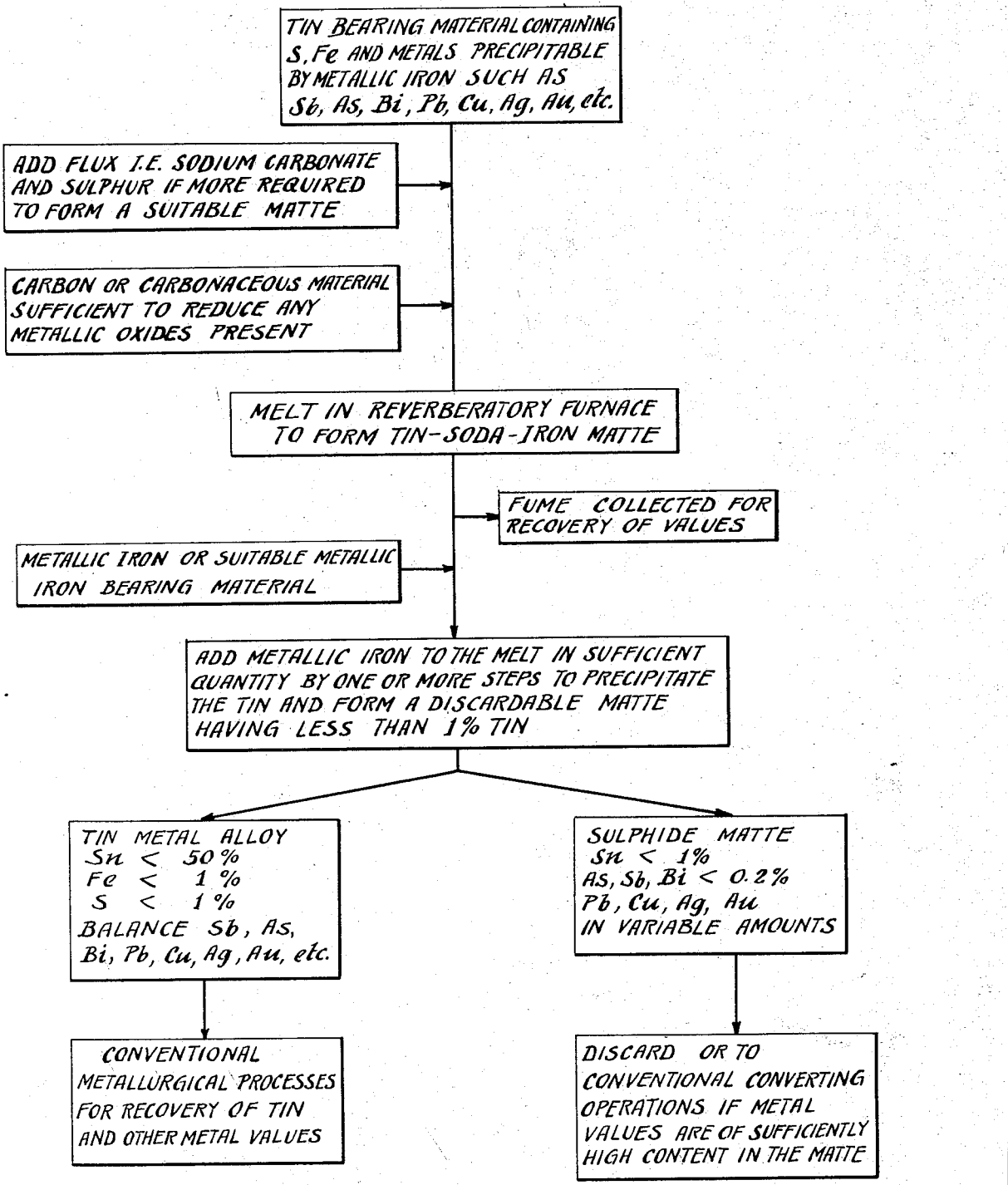

2,364,727

UNITED STATES PATENT OFFICE 2,364,727

PROCESS OF TREATING TIN SULPHIDE CONCENTRATES

Yurii E. Lebedeff, Metuchen, N. J., assignor to American Smelting and Refining Company, New York, N. Y., a corporation of New Jersey Application February 29, 1944, Serial No. 524,394

11 Claims. (Cl. 75—85)

This invention relates to a process for recovering metallic tin from tin ore concentrates or metallurgical by-products containing tin and more particularly to a process for treating sulphide-tin complexes to recover the tin as tin metal or suitable alloy.

In the methods normally employed for smelting oxide tin ore concentrates to recover the tin the general practice is to smelt the tin ore concentrates with silica, lime and carbonaceous reduction fuel to yield tin metal and slag. When such ores contain even small amounts of impurities, impure tin metal and slags relatively high in tin are produced. Additional processing of the tin metal and tin-containing slag is necessary to obtain a suitable grade of tin metal and a slag sufficiently low in tin to permit it to be discarded.

When oxide tin materials contain deleterious amounts of iron and other impurities, it is customary to give them some preliminary treatment, as by leaching with acids, to remove the impurities. With large amounts of impurities the cost of this becomes prohibitive.

None of the above methods is applicable to sulphide ores unless they are first roasted. For low grade oxide or sulphide complex tin ore concentrates or metallurgical by-products containing large amounts of iron and other impurities no satisfactory method of treatment is known. Various methods have been tried but they are all complex and very costly to operate.

It is an object of the present invention to provide a relatively inexpensive and simplified method of treating tin-bearing concentrates containing sulphur and iron and/or tin sulphide matte containing impurities including iron to recover the tin as tin metal or an alloy low in iron and sulphur.

Another object is to provide a pyrometallurgical process for treating tin sulphide bearing materials to produce tin metal of a high grade and a final matte for discard which is very low in tin.

Although the novel features which are believed to be characteristic of this invention will be particularly pointed out in the claims appended hereto, the invention itself, as to its further objects and advantages, and the manner in which it may be carried out, may be better understood by referring to the following description and accompanying drawing forming a part thereof in which a flow sheet of the process of this invention is shown for purposes of explanation.

According to my invention practically all of the tin contained in a fused sulphide matte is recovered as tin metal or alloy which is substantially free from iron and sulphur, by the addition of controlled amounts of metallic iron or other suitable substances containing iron in metallic form.

The reaction which takes place with the introduction of metallic iron according to my process is thought to be a chemical replacement effect, that is, the tin in the tin compounds of the sulphide matte is replaced by iron, the tin being released or precipitated as metallic tin which collects in a separate layer beneath the molten matte. This displacement reaction, like most chemical reactions of this kind, is a reversible one and is subject to the basic laws governing chemical equilibria.

In general, for any given set of conditions, such as, amount of sulphur present, solubility of metallic iron in precipitated metal, fluxes used, temperature and the like variables, a definite equilibrium relationship exists between the concentration of unreacted metallic iron in the precipitated metal phase (tin metal or alloy) and the tin content of the sulphide matte (slag) phase. The equilibrium reaction existing between the tin constituent of the matte and iron contained in the precipitated tin metal may be illustrated by the chemical equation:

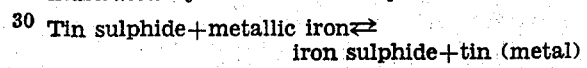

Tin sulphide+metallic iron⇌
  iron sulphide+tin (metal)

In the equation the unreacted metallic iron becomes alloyed with the metal phase provided it is alloyable therewith, otherwise it is dissolved or dispersed in the matte phase or exists as a separate layer. Where the material being treated contains little or no metals other than tin which are replaceable by iron, complete elimination of tin from the matte cannot be accomplished by a single treatment of the fused sulphide matte with metallic iron without producing a high-iron tin metal phase, that is, the precipitated tin metal will have a relatively high content of iron. If, however, the reaction is controlled so that the metal phase is kept low in iron, the corresponding sulphide slag phase is then found to be high in tin. The latter result may be overcome by resorting to a multistep counter-current process wherein the high-tin sulphide phase is returned for retreatment. In this manner the desired end products may be produced but at the expense of additional operations.

Where degradation of the precipitated metal phase is permissible, however, the equilibrium reaction can be made to proceed further to the right by decreasing the concentration of tin in the metal phase. This may be accomplished by simply introducing other metal or metals which will alloy with the precipitated tin metal, the added metal acting as a diluent. Further, if the tin forms an intermetallic compound or a series of compounds with the degradant metal or metals the reaction equilibrium shift to the right may be accentuated. By introducing iron precipitable metals other than tin the concentration of the tin in the alloy metal phase of the smelted charge is decreased permitting the production of an iron sulphide matte low in tin and a tin alloy metal low in iron in one operation.

In accordance with one embodiment of my invention I take advantage of the effect produced by the presence of diluent metals in processing tin sulphide complex concentrates whereby the tin is recovered therefrom as tin metal or alloy which is low in iron and sulphur by a one-step treatment of the fused matte with metallic iron. Where, however, the ore or metallurgical product being treated contains tin, sulphur and iron but none or only minor amounts of metals, other than tin which are precipitable by metallic iron, and sufficient metallic iron is added to reduce the tin content of the final matte to below 1%, there is produced a high iron-tin metal which requires retreatment with the next succeeding charge of sulphide matte in order to produce a tin metal low in iron and sulphur.

To avoid the formation of tin metal high in iron which has to be reworked when treating tin concentrates or metallurgical by-products containing tin, sulphur, iron and none or only small amounts of metals, other than tin, precipitable by metallic iron, such as bismuth, arsenic, antimony, lead, copper, silver, gold, etc., preferably controlled amounts of one or more of these iron replaceable substances is introduced into the charge to act as a diluent or degradant of the tin so that by a single treatment of the fused tin sulphide matte with metallic iron there may be produced an iron sulphide matte containing less than 1% tin and a tin metal alloy phase comprising less than 1% iron and 1% or less of sulphur. It has been further found that the equilibrium can be more readily displaced in the desired direction in the presence of certain fluxes and conditioners such as alkaline or alkaline earth compounds which will react with the charge to form alkaline or alkaline earth sulphides. For example, lime or sodium carbonate may be used, the latter being preferable because of its greater fusibility.

While it has not been uncommon to add metal powders, such as metallic iron, zinc, and/or carbon or the like to oxide slag-tin metal systems, such as in the reduction of cassiterite, to reduce the tin oxide present, the advantageous results produced by my invention are not obtained. By employing the process of this invention, however, tin ore concentrates and other tin-iron bearing materials can be processed in an ordinary reverberatory furnace heated in the conventional manner. Further, in practicing the reduction of tin oxide slag systems using metal powders and carbon additions it is practically impossible to produce a discard slag containing less than 1% tin. This is, however, readily accomplished, according to my invention, by forming a sulphide tin matte and smelting it with metallic iron or any suitable iron bearing material in sufficient amount to replace the tin, precipitating it as tin metal, while forming an iron sulphide slag or matte containing less than 1% tin, preferably about 0.1% or less, which may be discarded.

The accompanying flow sheet shows how the process is carried out. As indicated on the flow sheet metallic iron may be added in one or more steps as required to produce the desired tin alloy product and sulphide-iron matte containing less than 1% tin.

As typical examples illustrating how my process may be practiced the following is given:

*Example I*

One hundred thousand pounds of tin sulphide complex concentrate analyzing 11.2% Sn, 15.0% Cu, 6.2% Sb, 1.0% Pb, 0.8% Bi, 0.5% As, 14.7% Fe, 34.8% S, 1.7% SiO$_2$, 0.9% CaO and 1010.0 oz./T Ag with traces of Au was smelted in a reverberatory furnace at a temperature of about 1800° to 2000° F. with 20,000 lbs. of sodium carbonate and 2,000 lbs. of coke so as to form a fused liquid matte. To this molten charge was introduced 45,000 lbs. of metallic iron in the form of clean wire analyzing 55% metallic iron and 45% copper. During smelting and the reaction of the molten charge with the iron wire the dust collected from the fumes given off amounted to 10,250 lbs. which assayed about 20% Sn with other values and impurities. Tin metal alloy tapped from the furnace after the iron had reacted with the charge weighed 20,250 lbs. and analyzed 25.6% Sn, 39.5% Cu, 18.8% Sb, 2.2% Pb, 0.9% S, 0.7% As, 1.0% Fe, 2.1% Bi, and 2510.0 oz./T Ag.

The slag matte by-product produced amounted to 114,000 lbs. analyzing 0.95% Sn, 34.3% Fe, 20.6% S, the remainder being made up of Cu, Pb, As, Bi with a small amount of silver. This slag matte is processed by standard converting methods for recovery of metal values such as copper and silver where they are present in sufficient amounts, otherwise the slag matte is discarded. The tin-copper-antimony alloy which contains only 1% iron and less than 1% sulphur is processed to recover the tin, where desired, by employing conventional methods.

*Example II*

In this example the process was carried out with tin sulphide complex concentrate similarly as in Example I but the metallic iron was introduced in two steps.

In this instance only about three-fourths of the total metallic iron required was added to the fused sulphide charge and, after it had reacted, clean tin alloy metal which was relatively free from Fe and S was tapped from under the liquid tin bearing soda matte. Thereafter additional metallic iron in excess of that required to replace the tin remaining in the matte was introduced into the fused matte and when the iron had reacted with the matte a discard soda matte was drawn off as waste. This slag analyzed less than 0.20% Sn. A high-iron alloy metal was formed by this excess iron addition which was left in the furnace and reworked with the succeeding charge of tin sulphide complex. It is obvious from the previous discussion that the two-step iron addition method is employed when there are insufficient amounts of diluent metals precipitable by metallic iron present in the tin-iron sulphide complex to effectively limit the tin content of the matte produced.

In general, complex tin sulphide concentrates may be found in commercial practice which assay 5 to 35% S, 10–35% Fe, with varying amounts of Cu, Sb, As, Bi, Pb, SiO₂, CaO and doré. When smelting this kind of material in accordance with the principles of my invention, the sulphur content of the concentrate will be determined and sufficient sulphur is added to the charge, together with soda ash or the like flux so that a soda sulphide matte of proper sulphur content will be formed upon smelting the charge. Enough sulphur should be present to react with all the iron to form a suitable matte of proper fluidity.

The quantity of fluxing substances such as soda, lime or the like, required to be added may vary for producing the best results. Usually soda ash amounting to from 10 to 30% by weight of the tin concentrate is used, however, where the concentrate contains relatively large amounts of flux forming substances little or no soda or the like fluxing agents may be necessary. I have found it expedient when treating complex ore concentrates according to my invention, and which contain around three percent or less of fluxing material assaying $SiO_2$ and CaO, to add approximately 20% by weight of sodium carbonate and about 2% coke. Carbonaceous material in small amount is usually employed to counteract the oxidizing atmosphere of the furnace, however, if the furnace is operated under reducing conditions the addition of carbon may be omitted.

The amount of metallic iron required will vary depending upon the content of iron precipitable metals present in the tin sulphide concentrate. In general, the total metallic iron added will amount to from 15 to 30% by weight of the tin ore concentrate being treated. As a typical guide I have found in treating a tin ore concentrate comprising approximately 15% Sn, 35% S, 15% Fe and a total of about 25% of iron precipitable metals, i. e. Cu, Sb, Pb, Bi, As, Au and Ag, that the total metallic iron added in a one-step process amounted to approximately 25% by weight of the tin sulphide complex of the charge. The amount of metallic iron required may vary depending upon the metals present other than tin which alloy with tin and are reducible by metallic iron. Enough metallic iron is introduced either as a one or two-step method to produce a final matte containing 1% or less of tin.

From the foregoing it will be observed that I have devised a relatively simple and efficient method for treating tin bearing materials containing iron and sulphur to recover tin metal substantially free from or low in, iron and sulphur. In addition it will be seen that my new process provides a novel procedure for recovering tin metal from tin sulphide matte and producing a final discard matte markedly low in tin whereby the loss of tin through the matte by-product is for all practical purposes substantially eliminated.

It will be understood that I desire to comprehend within this invention such other changes and modifications as may readily suggest themselves to those skilled in the art and which come within the scope of the appended claims.

What is claimed is:

1. A pyrometallurgical process for treating tin bearing materials containing sulphur and iron as impurities to recover tin metal which comprises intermixing with the tin-bearing material 10 to 30% of sodium carbonate and smelting the charge to form a tin sulphide-soda-iron matte, introducing metallic iron into the molten mass in sufficient amount to react with said matte and produce a soda-iron sulphide matte phase containing 1% or less of tin and a tin metal phase containing less than 1% iron and less than 1% sulphur, and separating said soda-iron sulphide matte phase from the tin metal phase to recover said tin metal.

2. A pyrometallurgical process for treating tin bearing materials containing sulphur and iron in substantial amounts to recover tin metal comprising intermixing with the tin-bearing material a quantity of sodium carbonate up to 30%, a quantity of coke up to 2½%, said soda and coke added being based upon the weight of the tin bearing material used, smelting the mixture in a reverberatory furnace to produce a tin sulphide soda-iron matte and thereafter reacting the molten matte with metallic iron to replace the tin and iron precipitable metals in the matte and produce a discard slag matte containing 1% or less of tin and a tin metal containing less than 1% of iron and less than 1% sulphur as impurities.

3. A pyrometallurgical process which comprises intermixing with tin containing sulphide material a quantity of sodium carbonate up to 30%, a quantity of coke up to 2.5%, said soda and coke addition being based upon the weight of the tin sulphide concentrate treated, whereby to form a smeltable charge, smelting the charge in a reverberatory furnace at smelting temperatures to produce a tin-soda-iron matte, introducing iron metal in the smelted charge in sufficient amount to produce a tin metal phase containing less than 1% Fe and less than 1% sulphur, withdrawing said low iron and sulphur tin metal, adding more metallic iron in sufficient amount to produce a sulphide matte containing 1% or less of tin which matte may be discarded and a tin metal phase relatively high in iron which is left in the furnace and smelted with the succeeding charge.

4. A pyrometallurgical process for treating tin bearing material containing relatively large amounts of iron and sulphur and metals precipitable by metallic iron as impurities, comprising intermixing said tin-bearing material with sodium carbonate in sufficient amount to produce a fluid sulphide matte upon smelting the mixture and adding carbonaceous material to said mixture to reduce any oxides present or formed during the smelting operation, smelting the charge in a reverberatory furnace while collecting any fume produced for recovery of metal values, adding metallic iron to the molten charge in sufficient quantity to replace the tin constituent of the tin sulphide soda-iron matte so that it will contain 1% or less of tin, separating the thus formed low tin soda-iron matte which contains less than 1% tin and withdrawing the tin metal alloy therebeneath which assays less than 1% Fe and less than 1% sulphur, said tin alloy comprising substantially all the other metals present which are selectively precipitable by the addition of iron.

5. A pyrometallurgical process which comprises intermixing with tin bearing complexes which contain sulphur and iron as impurities and together with the tin comprise major constituents of the tin bearing material, a quantity of soda ash up to 30% and a quantity of coke up to 2.5%, said soda ash and coke added being based upon the weight of tin bearing concentrate constituent of the mixture, smelting the mixture in a reverberatory furnace at smelting temperature approximating 1800° to 2000° F. to produce a tin sulphide soda-iron matte, adding metallic iron to the molten charge and reacting it with said matte to cause substantially all the tin in said tin sulphide soda-iron matte to be replaced with iron whereby a soda-iron sulphide matte is produced which contains 1% or less of tin and substantially all the sulphur and iron of the charge, and wherein a tin metal alloy product is formed containing 1% or less of Fe and 1% or less of S, the tin being alloyed with iron precipitable metals present in said tin bearing complex.

6. A metallurgical process according to claim 5 wherein at least a portion of the metallic iron added to the molten charge is tin metal high in iron and formed as a by-product of a preceding smelted charge.

7. A metallurgical process according to claim 5 wherein the metallic iron is added in at least two stages and wherein the last addition of metallic iron is in excess of the metallic iron required to replace the tin sulphide in the tin-soda-iron matte whereby a sulphide matte is produced containing less than 1% tin which may be discarded and a phase composed of tin metal bullion low in Fe and S and a final tin metal product high in Fe which may be reacted with the succeeding charge.

8. A metallurgical process according to claim 5 wherein the iron precipitable metals present have been added to the tin bearing material as a diluent to cause a decrease in the concentration of the tin in the alloy metal phase produced during smelting whereby there is formed a matte low in tin and a metal alloy low in iron by one addition or treatment of the smelted charge with metallic iron.

9. A metallurgical process for treating tin bearing material to recover tin alloy metal which comprises intermixing with said tin bearing material a quantity of sodium carbonate up to 30%, and sulphur sufficient to form a tin sulphide-soda-iron matte upon smelting the mass, smelting the mixture in a reverberatory furnace at a temperature approximating 1800 to 2000° F., adding metallic iron bearing material to the smelted charge and reacting it with said matte to cause substantially all the tin in said tin sulphide soda-iron matte to be replaced with iron whereby a soda-iron sulphide matte is produced which contains 1% or less of tin and substantially all the sulphur and iron of the charge, and wherein a tin metal alloy product is formed containing 1% or less of Fe and 1% or less of S, the tin being alloyed with iron precipitable metals present in said tin bearing material.

10. A pyrometallurgical process for treating tin containing complexes which contain sulphur and iron as impurities together with alkali fluxing substances comprising adding a small amount of carbonaceous material to reduce any oxides present and prevent their formation during smelting, smelting the mixture in a reverberatory furnace at a temperature between 1800° and 2000° F. to produce a tin-sulphide-iron matte, adding metallic iron to the molten charge and reacting it with said matte to cause replacement of substantially all the tin in the matte by iron whereby an iron-sulphide matte is formed which contains 1% or less of tin and substantially all the sulphur and iron of the charge, and wherein an alloy tin metal phase is produced containing approximately less than 1% of iron and approximately less than 1% sulphur with the tin forming an alloy with the tin precipitable metals present in the charge, and drawing off said tin alloy metal to recover the relatively pure tin alloy.

11. A metallurgical process according to claim 1 wherein sulphur is added to the tin-bearing material in order to assist in forming the tin sulphide-soda-iron matte which is reacted with the metallic iron to replace substantially all the tin of said matte with iron.

YURII E. LEBEDEFF.